(12) United States Patent
Son et al.

(10) Patent No.: US 9,419,755 B2
(45) Date of Patent: Aug. 16, 2016

(54) APPARATUS AND METHOD FOR PROVIDING HARQ FOR RANGING IN A WIRELESS COMMUNICATION SYSTEM

(75) Inventors: Yeong-Moon Son, Yongin-si (KR); Jae-Hyuk Jang, Suwon-si (KR); Jae-Jeong Shim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 12 days.

(21) Appl. No.: 13/113,338

(22) Filed: May 23, 2011

(65) Prior Publication Data

US 2011/0286409 A1    Nov. 24, 2011

(30) Foreign Application Priority Data

May 23, 2010  (KR) .................. 10-2010-0047798
Jun. 22, 2010  (KR) .................. 10-2010-0059027

(51) Int. Cl.
| | | |
|---|---|---|
| *H04W 4/00* | (2009.01) | |
| *H04L 1/18* | (2006.01) | |
| *H04L 1/00* | (2006.01) | |
| *H04L 1/16* | (2006.01) | |

(52) U.S. Cl.
CPC ............ *H04L 1/1864* (2013.01); *H04L 1/0041* (2013.01); *H04L 1/0061* (2013.01); *H04L 1/0072* (2013.01); *H04L 1/1657* (2013.01)

(58) Field of Classification Search
USPC ................. 370/310, 328–331, 342, 349, 350; 455/422.1, 435, 436, 437, 438, 450
See application file for complete search history.

(56) References Cited

U.S. PATENT DOCUMENTS

| | | | |
|---|---|---|---|
| 8,873,476 B2 | 10/2014 | Lee et al. | |
| 2004/0202147 A1* | 10/2004 | Hakkinen ............. | H04L 1/1678 370/351 |
| 2007/0104177 A1* | 5/2007 | Hwang et al. .................. | 370/348 |
| 2007/0191009 A1 | 8/2007 | Hong et al. | |
| 2007/0202882 A1* | 8/2007 | Ju et al. .......................... | 455/450 |
| 2008/0117854 A1* | 5/2008 | Saifullah et al. .............. | 370/315 |
| 2008/0181168 A1 | 7/2008 | Han et al. | |
| 2008/0285500 A1* | 11/2008 | Zhang et al. ................... | 370/315 |
| 2009/0207809 A1 | 8/2009 | Son et al. | |
| 2009/0247202 A1* | 10/2009 | Jang et al. ...................... | 455/509 |
| 2009/0298504 A1* | 12/2009 | Lee et al. ....................... | 455/437 |
| 2010/0074153 A1* | 3/2010 | Torsner et al. ................. | 370/280 |
| 2010/0246490 A1* | 9/2010 | Lavi et al. ...................... | 370/328 |
| 2010/0278093 A1* | 11/2010 | Wang et al. .................... | 370/312 |

FOREIGN PATENT DOCUMENTS

| | | | | |
|---|---|---|---|---|
| CN | 101400144 A | 4/2009 | | |
| JP | 2012-504610 A | 2/2012 | | |
| JP | 2012-523196 A | 9/2012 | | |
| KR | WO 2009093878 A1 * | 7/2009 | ........ | H04W 36/0077 |
| WO | 2009/028102 A1 | 3/2009 | | |
| WO | 2010/117203 A2 | 10/2010 | | |

* cited by examiner

*Primary Examiner* — Zewdu A Beyen
(74) *Attorney, Agent, or Firm* — Jefferson IP Law, LLP (57) ABSTRACT

An apparatus and method for providing selective Hybrid Automatic Repeat reQuest (HARQ) for a ranging service in a wireless communication system are provided. A HARQ method includes transmitting, to at least one Mobile Station (MS), ranging code division information, and if a ranging code is received from the MS, allocating the MS a resource considering the ranging code, and if a ranging signal is not received through the resource allocated to the MS, making a request for retransmission of the ranging signal to the MS.

20 Claims, 7 Drawing Sheets

APPARATUS AND METHOD FOR PROVIDING HARQ FOR RANGING IN A WIRELESS COMMUNICATION SYSTEM

PRIORITY

This application claims the benefit under 35 U.S.C. §119 (a) to Korean patent applications filed in the Korean Intellectual Property Office on May 23, 2010 and assigned Serial No. 10-2010-0047798, and on Jun. 22, 2010 and assigned Serial No. 10-2010-0059027, the entire disclosures of which are hereby incorporated by reference.

BACKGROUND OF THE INVENTION

1. Field of the Invention

The present invention relates to an apparatus and method for Hybrid Automatic Repeat reQuest (HARQ) in a wireless communication system. More particularly, the present invention relates to an apparatus and method for supporting HARQ for ranging of a Mobile Station (MS) in the wireless communication system.

2. Description of the Related Art

In a case where there is not a resource that an MS is allocated from a Base Station (BS) in a wireless communication system, the MS transmits any ranging code to the BS.

In a case where the BS receives the ranging code, the BS cannot identify the MS having transmitted the ranging code, so the BS allocates a resource to the MS using resource allocation information that is called a Code Division Multiple Access (CDMA)_Allocation_Information Element (IE).

The MS transmits a ranging request message (RNG-REQ) to the BS using the resource allocated from the BS.

However, after the MS and the BS perform a link adaptation procedure, in a case where the MS transmits the ranging request message (RNG-REQ) to the BS, there is a problem that, because the BS applies a robust Modulation and Coding Scheme (MCS) level and repetition to the transmission of the ranging request message (RNG-REQ) of the MS, a service range for ranging is restricted.

SUMMARY OF THE INVENTION

Aspects of the present invention are to address at least the above-mentioned problems and/or disadvantages and to provide at least the advantages below. Accordingly, an aspect of the present invention is to provide an apparatus and method for increasing a service range for ranging in a wireless communication system.

Another aspect of the present invention is to provide an apparatus and method for supporting Hybrid Automatic Repeat reQuest (HARQ) for ranging of a Mobile Station (MS) in a wireless communication system.

A further aspect of the present invention is to provide an apparatus and method for supporting HARQ of a ranging request message (RNG-REQ), for a HARQ supported MS in a Base Station (BS) of a wireless communication system.

Yet another aspect of the present invention is to provide an apparatus and method for distinguishing, by a ranging code, a HARQ support MS and a HARQ non-support MS in order to support HARQ of a ranging request message (RNG-REQ) in a BS of a wireless communication system.

Still another aspect of the present invention is to provide an apparatus and method for supporting HARQ of a ranging request message (RNG-REQ) in an MS of a wireless communication system.

The above aspects are achieved by providing an apparatus and method for providing HARQ for ranging in a wireless communication system.

According to an aspect of the present invention, a BS operation method is provided. The method includes transmitting, to at least one MS, ranging code division information, and if a ranging code is received from the MS, allocating the MS a resource considering the ranging code, and if a ranging signal is not received through the resource allocated to the MS, making a request for retransmission of the ranging signal to the MS.

According to another aspect of the present invention, an MS operation method is provided. The method includes identifying ranging code division information, selecting a ranging code from among at least two ranging codes comprised in the ranging code division information, and transmitting the selected ranging code to a BS, being allocated a resource for the selected ranging code from the BS, transmitting a ranging signal to the BS through the allocated resource, and if the BS makes a request for retransmission, retransmitting the ranging signal to the BS.

According to a further aspect of the present invention, an MS apparatus is provided. The apparatus includes a receiver for receiving a signal, a transmitter for transmitting a signal, and a controller for transmitting, to at least one MS, ranging code division information, and if a ranging code is received from the MS, allocating the MS a resource considering the ranging code, wherein, if a ranging signal is not received through the resource allocated to the MS, the controller makes a request for retransmission of the ranging signal, to the MS.

According to yet another aspect of the present invention, an MS apparatus is provided. The apparatus includes a receiver for receiving a signal, a transmitter for transmitting a signal, and a controller for selecting a ranging code from among at least two ranging codes comprised in ranging code division information and transmitting the selected ranging code to a BS through the transmitter, transmitting a ranging signal to the BS through the transmitter by way of a resource for the ranging code allocated from the BS, wherein, if the BS makes a request for retransmission, the controller controls for retransmitting the ranging signal to the BS through the transmitter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of the present invention will become more apparent from the following description taken in conjunction with the accompanying drawings in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

FIGS. 1 through 5, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly state otherwise. A set is defined as a non-empty set including at least one element.

Exemplary embodiments of the present invention provide a technology for selectively applying Hybrid Automatic Repeat reQuest (HARQ) of ranging in a wireless communication system.

The following description is based on the assumption that a Base Station (BS) and a Mobile Station (MS) predetermine information for HARQ of ranging before the ranging.

Figure 1A:
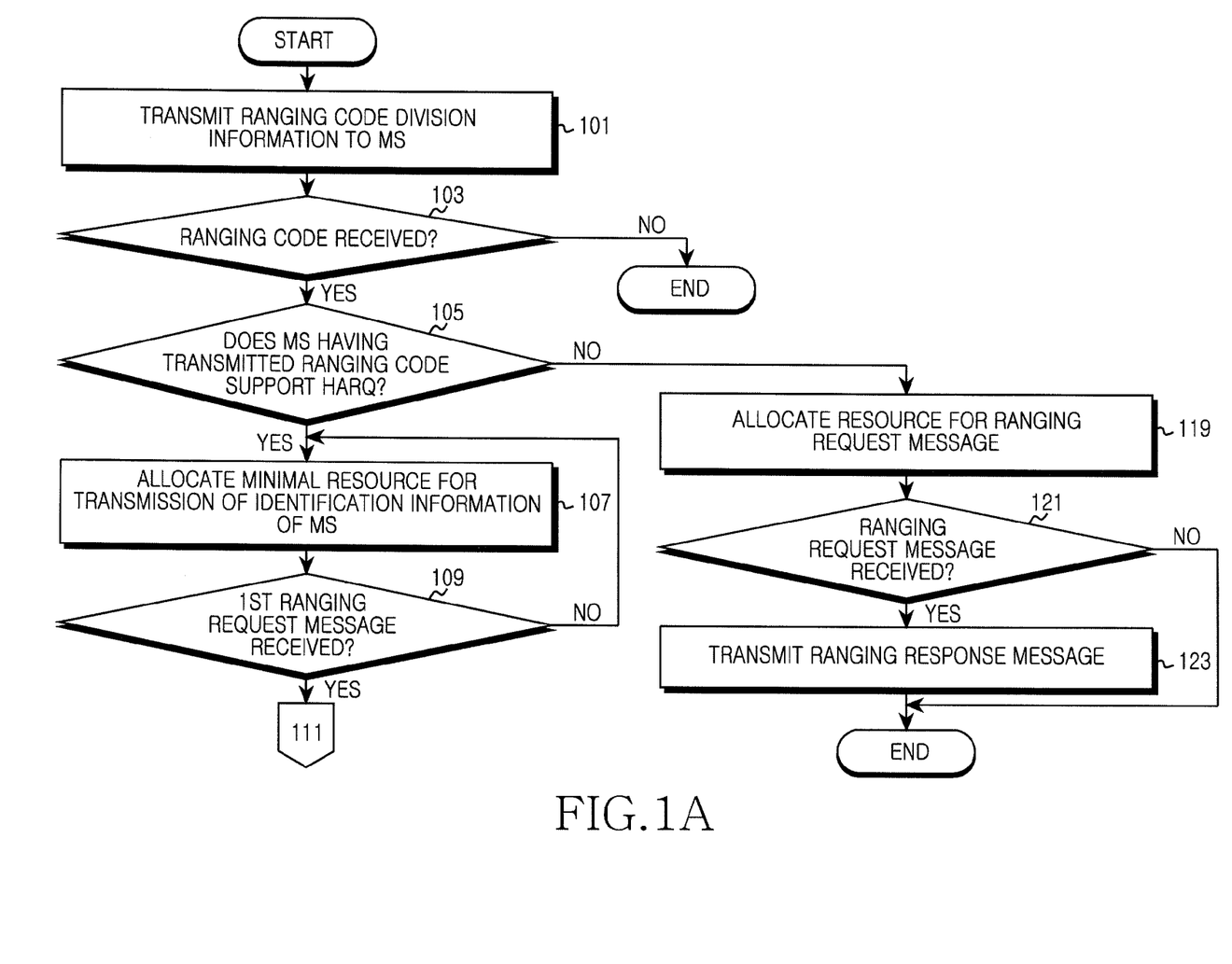
FIG. 1 is a diagram illustrating a ranging procedure with a Mobile Station (MS) in a Base Station (BS) according to an exemplary embodiment of the present invention.
Figure 1B:
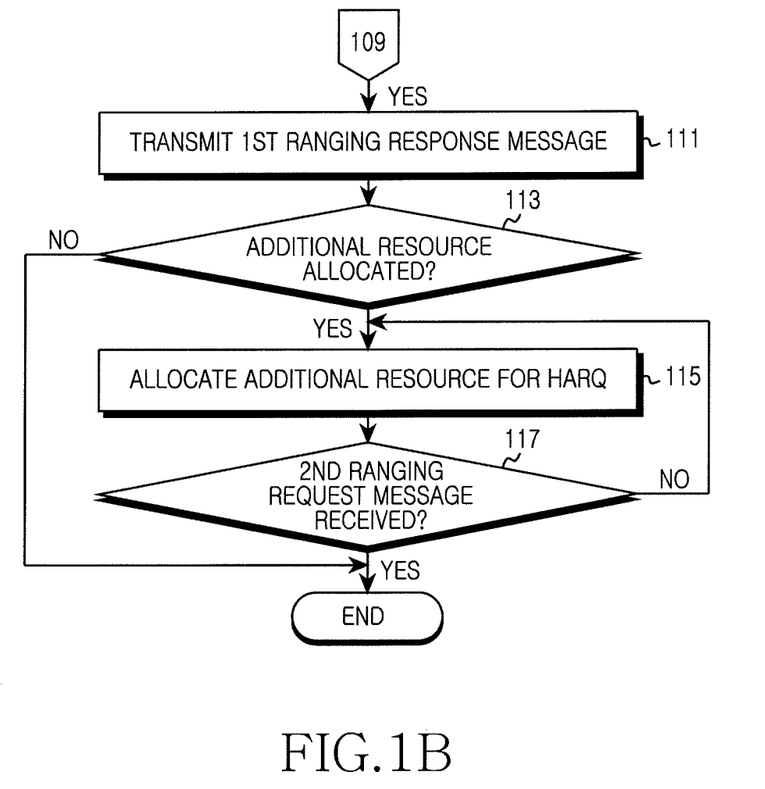

FIG. 1 illustrates a ranging procedure with an MS in a BS according to an exemplary embodiment of the present invention.

Referring to FIG. 1, in step 101, the BS transmits ranging code division information to at least one MS that is located in a service area. For example, the BS transmits an Uplink Channel Descriptor (UCD) message including the ranging code division information, to the at least one MS located in the service area. Here, the ranging code division information is defined for an MS supporting HARQ included in the UCD message, and can be shown as in Table 1.

TABLE 1

| Name | Type (1 byte) | Length | Value |
| --- | --- | --- | --- |
| Handover Ranging Codes for HARQ_CDMA_allocation | 219 | 1 | Number of HO ranging CDMA codes. After receiving the codes, the BS allocates uplink resources through HARQ_CDMA_allocation_IE. Possible values are 0-255 |
| Initial ranging codes for HARQ_CDMA_allcoation | 220 | 1 | Number of initial ranging CDMA codes. After receiving the codes, the BS allocates uplink resources through HARQ_CDMA_allocation_IE. Possible values are 0-255. |
| Periodic ranging codes for HARQ_CDMA_allcoation | 221 | 1 | Number of periodic ranging CDMA codes. After receiving the codes, the BS allocates uplink resources through HARQ_CDMA_allocation_IE. Possible values are 0-255. |
| Bandwidth request codes for HARQ_CDMA_allcoation | 222 | 1 | Number of BR codes. After receiving the codes, the BS allocates uplink resources through HARQ_CDMA_allocation_IE. Possible values are 0-255. |

After that, the BS proceeds to step 103 and determines whether a ranging code is received from an MS located in the service area.

If it is determined in step 103 that the ranging code is not received, the BS terminates an algorithm according to the present invention. In a different example, the BS may return to step 101 and transmit a UCD message to at least one MS every predefined period.

In contrast, if it is determined in step 103 that the ranging code is received, the BS proceeds to step 105 and determines whether the MS having transmitted the ranging code to the BS supports HARQ depending on the kind of the received ranging code.

If it is determined in step 105 that the MS supports HARQ, the BS proceeds to step 107 and allocates for the MS an UpLink (UL) resource necessary for transmitting a required parameter for distinguishing MSs. For example, the BS allocates the MS a resource through which the MS can transmit its own identification information and Grant Management Sub-Header (GMSH), using a resource allocation message (i.e., a Code Division Multiple Access (CDMA)_Allocation_Information Element (IE)). At this time, the BS is not aware of the identification information of the MS for transmitting the resource allocation message (i.e., the CDMA_Allocation_IE). Accordingly, the BS configures the CDMA_Allocation_IE to indicate the MS by way of an index of a ranging code and a ranging code reception position. If a plurality of ranging codes are received in the same frame, the BS transmits a CDMA_Allocation_IE for each ranging code and allocates a UL resource to each MS. Here, the GMSH represents a subheader that an MS is to use for making a request for an amount of an additionally required resource besides a ranging request message (RNG-REQ). Further, the ranging code reception position can be indicated by a frame number. Here, the CDMA_Allocation_IE can be configured as in Table 2 below.

TABLE 2

| Syntax | Size (bit) | Notes |
|---|---|---|
| CDMA_Allocation_IE( ){ | — | — |
|   Duration | 6 | — |
|   UIUC | 4 | UTUC for transmission |
|   Repetition Coding Indication | 2 | 0b00: No repetition coding<br>0b01: Repetition coding of 2 used<br>0b10: Repetition coding of 4 used<br>0b11: Repetition coding of 6 used |
|   Frame Number Index | 4 | Least Significant Bits (LSBs) of relevant frame number |
|   Ranging Code | 8 | — |
|   Ranging Symbol | 8 | — |
|   Ranging subchannel | 7 | — |
|   BW request maudatory | 1 | 1: Yes<br>0: No |
| } | — | — |

After that, the BS proceeds to step 109 and determines whether a first ranging request message (RNG-REQ) is received through the UL resource allocated to the MS.

If it is determined in step 109 that the first ranging request message (RNG-REQ) is not received, the BS recognizes that the MS fails in ranging. Accordingly, the BS returns to step 107 and again allocates the MS a resource for receiving retransmission of the first ranging request message (RNG-REQ), through HARQ. For example, the BS allocates the MS the resource for receiving, from the MS, the retransmission of the first ranging request message (RNG-REQ), using a CDMA_Allocation_IE. Here, the CDMA_Allocation_IE represents making a request for retransmission of the first ranging request message (RNG-REQ) using variables such as frame number index, a ranging code, a ranging symbol, and a ranging subchannel shown in Table 2. That is, the variables such as the frame number index, the ranging code, the ranging symbol, and the ranging subchannel represent reuse of information on a ranging code that the MS has transmitted lastly. When a ranging request message is received retransmitted from the MS, the BS decodes the received ranging request message by a soft combining in accordance with HARQ.

In contrast, if it is determined in step 109 that the BS receives the first ranging request message (RNG-REQ) through the UL resource allocated to the MS, the BS proceeds to step 111 and transmits a ranging response message (RNG-RSP) to the MS, in response to the received first ranging request message (RNG-REQ). Here, the ranging response message (RNG-RSP) includes a basic Connection IDentifier (CID) and a primary management CID.

Next, in step 113, the BS identifies a GMSH of the first ranging request message (RNG-REQ) to determine whether to allocate an additional resource to the MS.

If it is determined in step 113 that the GMSH of the first ranging request message (RNG-REQ) exists and a Piggy-BackRequest of the GMSH is not equal to '0', the BS determines to allocate the additional resource to the MS. So, the BS proceeds to step 115 and allocates the MS an additional resource that the MS makes a request for through the GMSH. At this time, the BS transmits additionally allocated resource information to the MS using a HARQ UL-MAP IE configured as in Table 3 below. That is, since the BS has allocated the basic CID and the primary management CID to the MS through the ranging response message (RNG-RSP), the BS transmits the additionally allocated resource information to the MS using the HARQ UL-MAP IE configured as in Table 3 below.

TABLE 3

| Syntax | Size (bit) | Notes |
|---|---|---|
| HARQ_UL_MAP_IE | — | — |
|   Extended-2 UIUC | 4 | HARQ_UL_MAP_IE( )==0x07 |
|   Length | 8 | Length in bytes |
|   RCID_Type | 2 | 0b00: Normal CID<br>0b01: RCID11<br>0b10: RCID7<br>0b11: RCID3 |
|   Reserved | 2 | — |
|   while (data remains){ | — | — |
|     Mode | 3 | Indicates the mode of this IE:<br>0b000: Chase HARQ<br>0b001: Incremental redundancy HARQ for CTC<br>0b010: Incremental redundancy HARQ for convolutional code<br>0b011: MIMO Chase HARQ<br>0b100: MIMO IR HARQ<br>0b101: MIMO IR HARQ for convolutional code |

TABLE 3-continued

| Syntax | Size (bit) | Notes |
|---|---|---|
| | | 0b110: MIMO STC HARQ |
| | | 0b111: Reserved |
| Allocation Start Indication | 1 | 0: No allocation start information |
| | | 1: Allocation start information follows |
| If(Allocation Start Indication ==1){ | — | — |
|     OFDMA Symbol offset | 8 | This value indicates start Symbol offset of subsequent subbursts in this HARQ UL-MAP IE with reference to the start of the UL subframe |
|     Subchannel offset | 7 | This value indicates start Subchannel offset of subsequent subbursts in this HARQ UL-MAP IE |
|     H-FDD UL subframe indicator | 1 | Only applies to FDD MS in FDD/H-FDD |
| | | 0b0: UL subframe relevant to current UL-MAP[or UL subframe 2(UL1)] |
| | | 0b1: The other UL subframe[or UL subframe 1(UL2)] |
| | | shall be set to zero for TDD and H-FDD only MS in FDD/H-FDD |
| } | — | — |
| N subbursts | 4 | Number of subbursts in this HARQ UL MAP IE is this field value plus 1 |
| For(i=0; i<Number of subbursts; i++){ | — | — |
|     If(Mode == 000){ | — | — |
|         UL HARQ Chase subburst IE( ) | — | — |
|     } else if(Mode == 001){ | — | — |
|         UL HARQ IR CTC subburst IE( ) | — | — |
|     } else if(Mode == 010){ | — | — |
|         UL HARQ IR CC subburst IE( ) | — | — |
|     } else if(Mode == 011){ | — | — |
|         MIMO UL Chase HARQ subburst IE( ) | — | — |
|     } else if(Mode == 100){ | — | — |
|         MIMO UL IR HARQ subburst IE( ) | — | — |
|     } else if(Mode == 101){ | — | — |
|         MIMO UL IR HARQ for CC subburst IE( ) | — | — |
|     } else if(Mode == 110){ | — | — |
|         MIMO UL STC HARQ subburst IE( ) | — | — |
|     } | — | — |
| } | — | — |
| } | — | — |
| Padding | variable | Padding to byte; shall be set to 0 |
| } | — | — |

Next, the BS proceeds to step 117 and determines whether a second ranging request message (RNG-REQ) is received through the UL resource allocated to the MS.

If it is determined in step 117 that the second ranging request message (RNG-REQ) is not received through the UL resource allocated to the MS, the BS recognizes that the MS fails in transmitting the second ranging request message (RNG-REQ). So, the BS returns to step 115 and again allocates the MS a resource for receiving retransmission of the second ranging request message (RNG-REQ). For example, the BS allocates the MS the resource for receiving the retransmission of the second ranging request message (RNG-REQ) using a HARQ UL-MAP IE. At this time, the BS transmits ACKnowledgement/Negative ACKnowledgement (ACK/NACK) information of the second ranging request message (RNG-REQ) to the MS, using an ARQ Identifier_Sequence_Number (AI_SN) of a HARQ subburst IE included in the HARQ UL-MAP IE. More particularly, in a case where the BS sets the AI_SN to the same value as an AI_SN within a HARQ subburst IE of the MS included within a just previous HARQ UL-MAP IE to transmit the ACK/NACK information to the MS, the MS recognizes that the HARQ UL-MAP IE is the NACK information of the second ranging request message (RNG-REQ). Further, the BS may transmit the ACK/NACK information of the second ranging request message (RNG-REQ) to the MS using a DownLink (DL) HARQ ACK IE. That is, the BS can indicate a bit of a corresponding MS by '1' or '0' in a bitmap of the DL HARQ ACK IE to indicate the ACK/NACK information of the second ranging request message (RNG-REQ).

In contrast, if it is determined in step 117 that the BS receives a second ranging request message (RNG-REQ) through the UL resource allocated to the MS, the BS terminates the algorithm according to the present invention. At this time, although not illustrated, when the BS receives the second ranging request message (RNG-REQ), the BS transmits a second ranging response message (RNG-RSP) to the MS in response to the second ranging request message (RNG-REQ).

If it is determined in step 105 that the MS does not support HARQ, the BS proceeds to step 119 and allocates a resource for a ranging request message (RNG-REQ) to the MS that has transmitted the ranging code to the BS.

After that, the BS proceeds to step 121 and determines whether the ranging request message (RNG-REQ) is received through the UL resource allocated to the MS.

If it is determined in step 121 that the BS does not receive the ranging request message (RNG-REQ), the BS terminates the algorithm according to the present invention.

In contrast, if it is determined in step 121 that the BS receives the ranging request message (RNG-REQ), the BS proceeds to step 123 and transmits a ranging response message (RNG-RSP) to the MS, in response to the ranging request message (RNG-REQ).

After that, the BS terminates the algorithm according to the present invention.

In the aforementioned exemplary embodiment, in a case where a BS does not receive a first ranging request message (RNG-REQ), the BS again allocates a resource to the MS using a CDMA_Allocation_IE, for the sake of HARQ of the first ranging request message (RNG-REQ).

Further, in a case where the BS does not receive a second ranging request message (RNG-REQ), the BS again allocates a resource to the MS using a HARQ UL-MAP IE, for the sake of HARQ of the second ranging request message (RNG-REQ).

In another exemplary embodiment, in a case where a BS does not receive a first ranging request message (RNG-REQ), the BS determines whether the MS can retransmit the first ranging request message (RNG-REQ) considering the number of retransmission of the first ranging request message (RNG-REQ). If it is determined that the MS can retransmit the first ranging request message (RNG-REQ), the BS again allocates a resource to the MS using a CDMA_Allocation_IE, for the sake of HARQ of the first ranging request message (RNG-REQ).

Further, in a case where the BS does not receive a second ranging request message (RNG-REQ), the BS determines whether the MS can retransmit the second ranging request message (RNG-REQ) considering the number of retransmission of the second ranging request message (RNG-REQ). If it is determined that the MS can retransmit the second ranging request message, the BS again allocates a resource to the MS using a HARQ UL-MAP IE, for the sake of HARQ of the second ranging request message (RNG-REQ).

Figure 2A:
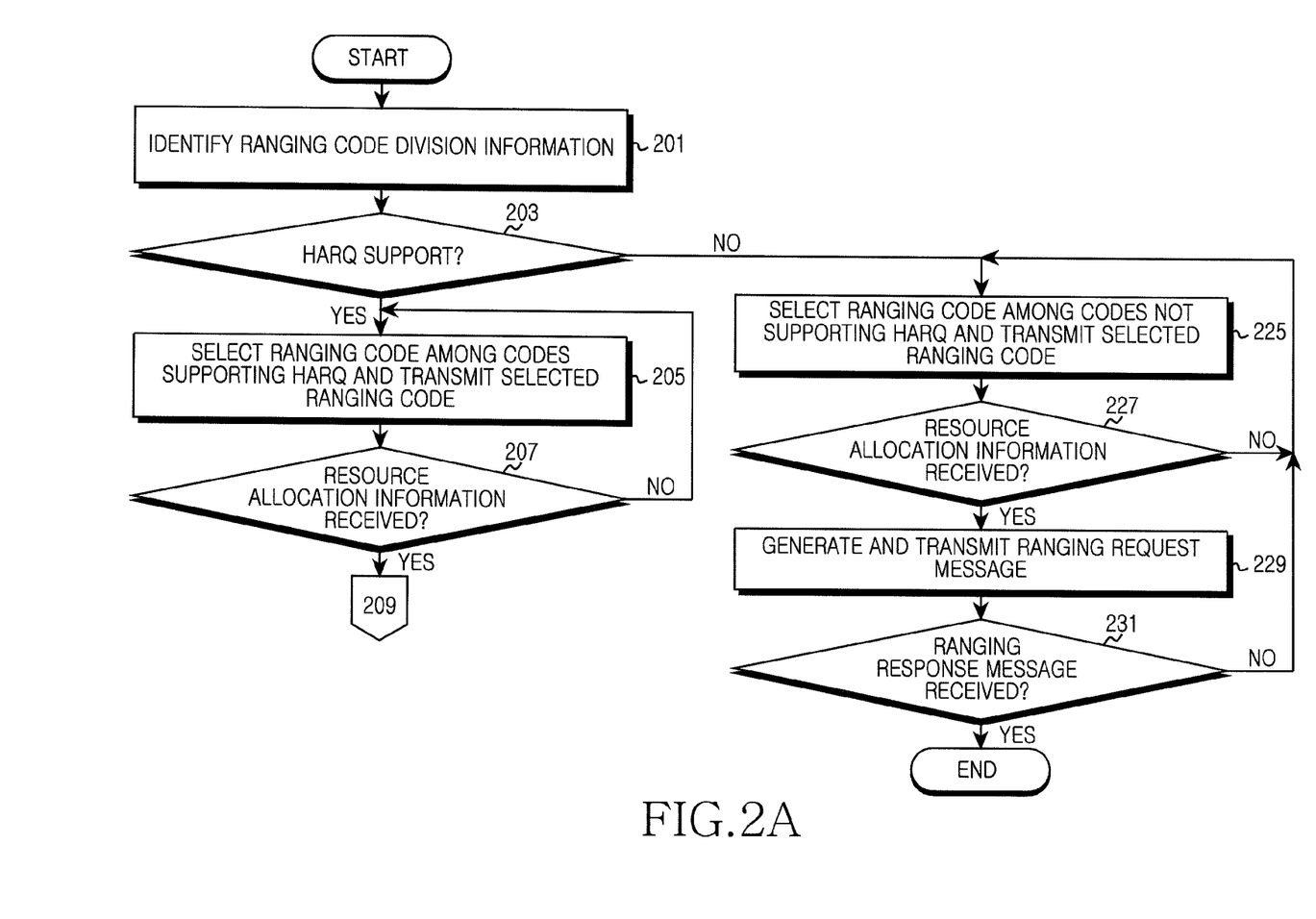
FIG. 2 is a diagram illustrating a ranging procedure in an MS according to an exemplary embodiment of the present invention.
Figure 2B:
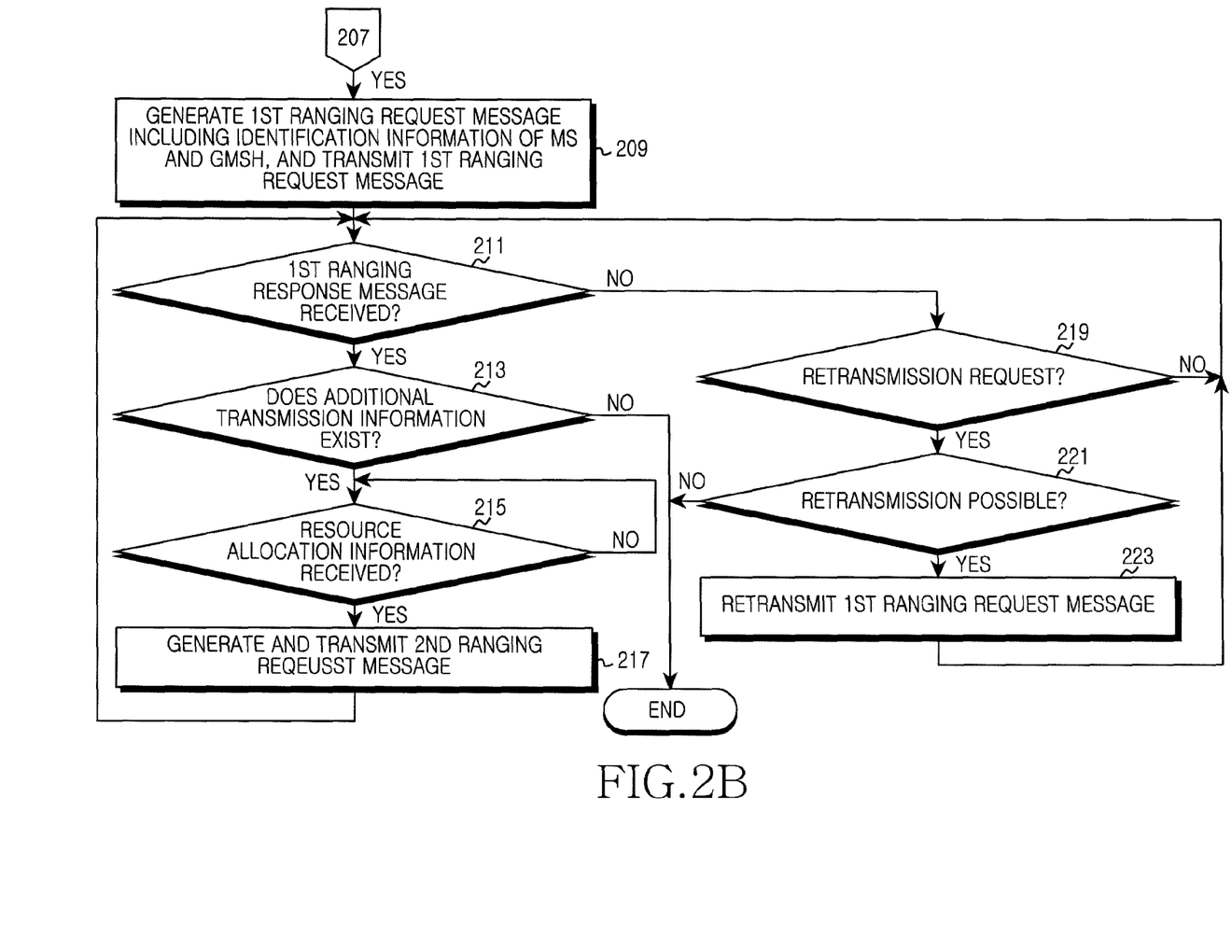

FIG. 2 illustrates a ranging procedure in an MS according to an exemplary embodiment of the present invention.

Referring to FIG. 2, in step 201, the MS identifies ranging code division information. For example, the MS identifies the ranging code division information in a UCD message provided from a BS.

After that, the MS proceeds to step 203 and determines whether it can support HARQ.

If it is determined in step 203 that the MS supports HARQ, in step 205, the MS selects a ranging code from among ranging codes supporting HARQ in the ranging code division information and transmits the selected ranging code to the BS. At this time, the MS selects a ranging code with reference to Table 4 below.

TABLE 4

| Name | Type (1 byte) | Length | Value |
|---|---|---|---|
| Start of ranging codes group | 155 | 1 | Indicates the starting number, S, of the group of codes used for this UL. If not specified, the default value shall be set to zero. All the ranging codes used on this UL shall be between S and ((S + O + N + M + L) mod 256) where<br>N is the number of initial ranging codes<br>M is the number of periodic ranging codes<br>L is the number of BR codes<br>O is the number of HO ranging codes<br>The range of values is 0 ≤ S ≤ 255. |
| Handover Ranging Codes | 194 | 1 | Number of HO ranging CDMA codes. Possible values are 0-255 |
| Initial ranging codes | 150 | 1 | Number of initial ranging CDMA codes. Possible values are 0-255 |
| Periodic ranging codes | 154 | 1 | Number of periodic ranging CDMA codes. Possible values are 0-255 |
| Bandwidth request codes | 152 | 1 | Number of BR codes. Possible values are 0-255 |

After that, the MS proceeds to step 207 and determines whether resource allocation information is received from the BS. For example, the MS determines whether a CDMA_Allocation_IE for the ranging code transmitted to the BS is received from the BS. At this time, the MS identifies its own CDMA_Allocation_IE using a frame number index, a ranging code/ranging symbol, and a ranging subchannel.

If it is determined in step 207 that the MS does not receive the resource allocation information from the BS during a constant time, the MS returns to step 205 again and selects a ranging code from among the ranging codes supporting HARQ in the ranging code division information and transmits the selected ranging code to the BS. For another example, the MS may again transmit, to the BS, the ranging code having been transmitted to the BS in step 205.

In contrast, if it is determined in step 207 that the MS receives the resource allocation information from the BS, the MS does not transmit a ranging code to the BS during a constant time. For example, in a case where a frame number index of a CDMA_Allocation_IE is configured with 4 bits, the MS does not transmit the ranging code to the BS during 16 frames after receiving the CDMA_Allocation_IE for the ranging code transmitted to the BS.

Further, if it is determined in step 207 that the MS receives the resource allocation information from the BS, the MS proceeds to step 209 and transmits a first ranging request message (RNG-REQ), which includes its own identification information and GMSH, to the BS using a resource allocated from the BS. At this time, the MS can configure the GMSH as in Table 5 below. Here, the GMSH is positioned before a ranging request message (RNG-REQ) within a Media Access Control (MAC) Packet Data Unit (PDU) of the ranging request message (RNG-REQ).

TABLE 5

| Syntax | Size (bit) | Notes |
|---|---|---|
| Grant Management Subheader{ | — | — |
|   if(scheduling service type==UGS){ | — | — |
|     SI | 1 | |
|     PMI | 1 | |
|     FLI | 1 | — |
|     FL | 4 | — |
|     Reserved | 9 | Shall be set to zero |
|   } else if(scheduling service type == Extended rtPS){ | — | — |
|     Extended piggyback request | 11 | — |
|     FLI | 1 | — |
|     FL | 4 | — |
|   } else{ | — | — |
|     PiggyBack Request | 16 | — |
|   } | — | — |
| } | — | — |

Next, the MS proceeds to step 211 and determines whether a first ranging response message (RNG-RSP) is received responsive to the first ranging request message (RNG-REQ) transmitted to the BS.

If it is determined in step 211 that the first ranging response message (RNG-RSP) is not received, the MS proceeds to step 219 and determines whether the BS makes a request for retransmission of the first ranging request message (RNG-REQ). For example, the MS determines whether the same CDMA_Allocation_IE as the CDMA_Allocation_IE received in step 207 is received.

If it is determined in step 219 that the BS does not make a request for the retransmission of the first ranging request message (RNG-REQ), the MS returns to step 211 and determines whether a first ranging response message (RNG-RSP) is received in response to the transmitted first ranging request message (RNG-REQ).

In contrast, if it is determined in step 219 that the MS receives the same CDMA_Allocation_IE as the CDMA_Allocation_IE received in step 207, the MS recognizes that the BS makes a request for retransmission of the first ranging request message (RNG-REQ). Accordingly, the MS proceeds to step 221 and determines whether it can retransmit the first ranging request message (RNG-REQ). For example, the MS determines whether it can retransmit the first ranging request message (RNG-REQ) considering the number of retransmission of the first ranging request message (RNG-REQ). For another example, the MS can determine whether it can retransmit the first ranging request message (RNG-REQ) using a T3 timer. That is, in a case where a frame number index of a CDMA_Allocation_IE is configured with 4 bits, information of the CDMA_Allocation_IE is valid during 16 frames. Accordingly, the MS can determine whether it can retransmit the first ranging request message (RNG-REQ) using the T3 timer driven as long as a 16-frame time. Here, the T3 timer is driven when the MS receives the CDMA_Allocation_IE in step 207. In a case where the T3 timer expires, the MS recognizes that it cannot perform retransmission of a first ranging request message (RNG-REQ).

In a case where the MS cannot retransmit the first ranging request message (RNG-REQ), the MS terminates the algorithm according to the present invention. At this time, the MS may transmit a new ranging code to the BS or attempt an access to a different BS.

If it is determined in step 221 that the MS can retransmit the first ranging request message (RNG-REQ), the MS proceeds to step 223 and retransmits the first ranging request message (RNG-REQ) to the BS. At this time, the MS retransmits the first ranging request message (RNG-REQ) using the resource allocation information provided from the BS through the CDMA_Allocation_IE in step 219.

If it is determined in step 211 that the MS receives the first ranging response message (RNG-RSP), the MS proceeds to step 213 and determines whether information to be additionally transmitted through ranging exists. That is, the MS identifies an amount of an additional request resource annexed to a PiggyBackRequest of the GMSH of the first ranging request message (RNG-REQ).

If it is determined in step 213 that the additional request resource is not annexed to the GMSH or the amount of the additional request resource annexed to the GMSH is equal to '0', the MS recognizes that the ranging is ended. Accordingly, the MS terminates the algorithm according to the present invention.

In contrast, if it is determined in step 213 that the amount of the additional request resource annexed to the GMSH is not equal to '0', the MS recognizes that information to be additionally transmitted exists. Accordingly, the MS proceeds to step 215 and determines whether resource allocation information for second ranging is received. Here, the resource allocation information for the second ranging is configured in a form of a HARQ UL-MAP IE as in Table 3 above.

If it is determined in step 215 that the resource allocation information for the second ranging is received, the MS proceeds to step 217 and generates a second ranging request message (RNG-REQ) and transmits the second ranging request message (RNG-REQ) to the BS.

Next, the MS proceeds to step 211 and determines whether a ranging response message (RNG-RSP) is received in response to the second ranging request message (RNG-REQ). That is, the MS performs HARQ of the second ranging request message (RNG-REQ) depending on reception or non-reception of the ranging response message (RNG-RSP) responsive to the second ranging request message (RNG-REQ).

If it is determined in step 203 that the MS does not support HARQ, in step 225, the MS selects a ranging code from among ranging codes not supporting HARQ in the ranging code division information and transmits the selected ranging code to the BS.

Next, the MS proceeds to step 227 and determines whether resource allocation information is received from the BS. For example, the MS determines whether a CDMA_Allocation_IE for the transmitted ranging code is received from the BS. At this time, the MS identifies its own CDMA_Allocation_IE using a frame number index, a ranging code/ranging symbol, and a ranging subchannel.

If it is determined in step 227 that the MS does not receive the resource allocation information from the BS during a constant time, the MS returns to step 225 and selects any ranging code among ranging codes supporting HARQ in the ranging code division information and transmits the selected ranging code to the BS. For another example, the MS may again transmit the ranging code having been transmitted to the BS in step 225, to the BS.

In contrast, if it is determined in step 227 that the MS receives the resource allocation information from the BS, the MS proceeds to step 229 and transmits a ranging request message (RNG-REQ) to the BS.

After that, the MS proceeds to step 231 and determines whether a ranging response message (RNG-RSP) is received from the BS in response to the ranging request message (RNG-REQ).

If it is determined in step 231 that the MS does not receive the ranging response message (RNG-RSP) from the BS during a constant time, the MS returns to step 225 and selects a ranging code and transmits the selected ranging code to the BS.

In contrast, if it is determined in step 231 that the MS receives the ranging response message (RNG-RSP) from the BS, the MS recognizes that ranging with the BS is ended, and terminates the algorithm according to the present invention.

Figure 3:
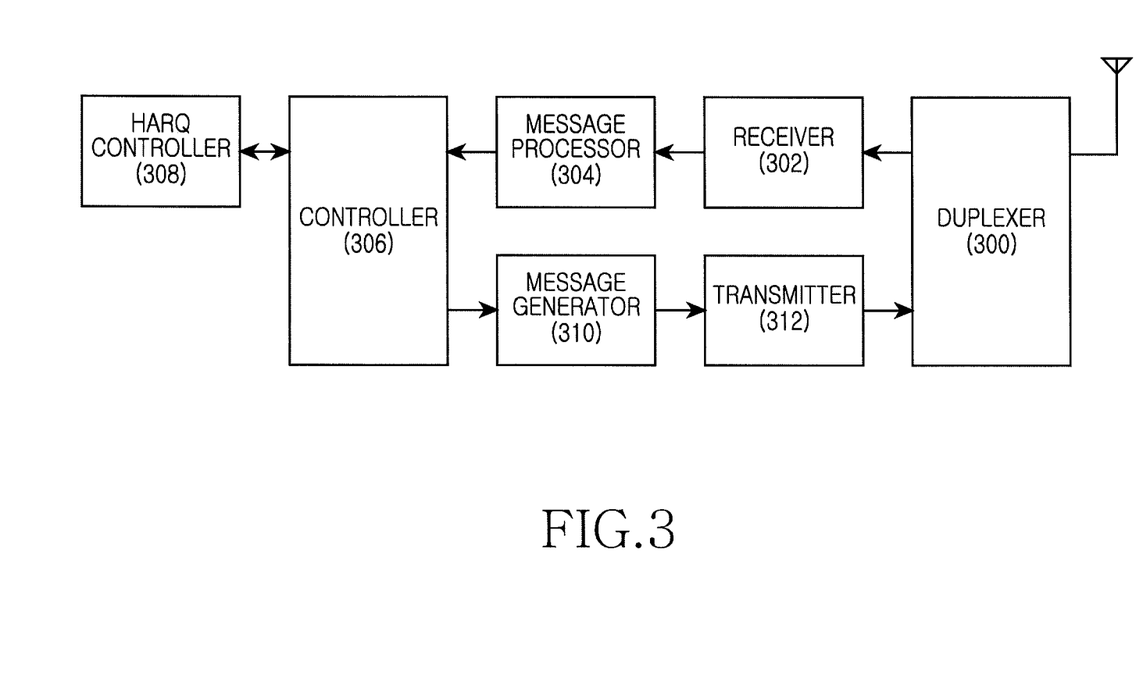
FIG. 3 is a block diagram illustrating an apparatus comprising a BS according to an exemplary embodiment of the present invention.

FIG. 3 is a block diagram illustrating an apparatus comprising a BS according to the present invention.

As illustrated in FIG. 3, the BS includes a duplexer 300, a receiver 302, a message processor 304, a controller 306, a HARQ controller 308, a message generator 310, and a transmitter 312.

According to a duplexing scheme, the duplexer 300 transmits a transmit signal provided from the transmitter 312, through an antenna, and provides a receive signal from the antenna, to the receiver 302.

The receiver 302 converts a Radio Frequency (RF) signal provided from the duplexer 300 into a baseband signal, for demodulation. The receiver 302 can include an RF processing block, a demodulation block, a channel decoding block, and the like. Here, the RF processing block converts an RF signal provided from the duplexer 300 into a baseband signal. The demodulation block may include a Fast Fourier Transform (FFT) operator for extracting data load on each subcarrier from a signal provided from the RF processing block, and the like. The channel decoding block may include a demodulator, a de-interleaver, a channel decoder, and the like.

The message processor 304 extracts control information from a signal provided from the receiver 302, and provides the control information to the controller 306. For example, the message processor 304 extracts a ranging code, a first ranging request message (RNG-REQ), a second ranging request message (RNG-REQ), and the like from a signal provided from the receiver 302, and provides the extracted ranging code, first ranging request message (RNG-REQ), and second ranging request message (RNG-REQ) to the controller 306.

The controller 306 controls general operation and scheduling of the BS. For example, in a case where the controller 306 receives a ranging code from the message processor 304, as illustrated in FIG. 1, the controller 306 allocates a UL resource for the ranging code. At this time, according to the control of the HARQ controller 308, the controller 306 can allocate only a minimum resource for transmitting identification information and a GMSH, to an MS supporting HARQ.

Further, according to the control of the HARQ controller 308, the controller 306 may allocate a resource for receiving retransmission of a first ranging request message (RNG-REQ) or allocate a resource for a second ranging request message (RNG-REQ).

Depending on the kind of a ranging code provided from the message processor 304, the HARQ controller 308 determines whether the MS having transmitted the ranging code supports HARQ. If the MS supports HARQ, the HARQ controller 308 controls the controller 306 to allocate only a minimum resource for transmitting the identification information and GMSH, to the MS supporting HARQ.

Further, in a case where the controller 306 does not receive a first ranging request message (RNG-REQ) through a UL resource allocated to an MS supporting HARQ, the HARQ controller 308 controls the controller 306 to allocate the MS a resource for receiving retransmission of the first ranging request message (RNG-REQ). When a ranging request message is received retransmitted from the MS, the BS decodes the received ranging request message by a soft combining in accordance with HARQ In a case where a resource amount for which the MS makes a request to transmit a second ranging request message (RNG-REQ) through a GMSH of a first ranging request message (RNG-REQ) provided from the message processor 304 is identified, the HARQ controller 308 controls the controller 306 to allocate an additional resource for ranging.

According to the control of the controller 306, the message generator 310 generates a control message to be transmitted to an MS. For example, according to the control of the controller 306, the message generator 310 generates a UCD message including ranging code division information. For another example, according to the control of the controller 306, the message generator 310 generates a resource allocation message of a CDMA_Allocation_IE form of Table 2 including resource allocation information for a first ranging request message (RNG-REQ). For further example, according to the control of the controller 306, the message generator 310 generates a resource allocation message of a HARQ UL-MAP IE form of Table 3 including resource allocation information for a second ranging request message (RNG-REQ).

The transmitter 312 encodes data to be transmitted to an MS and a control message provided from the message generator 310, converts the encoded data and control message into an RF signal, and transmits the RF signal to the duplexer 300. For example, the transmitter 312 can include a channel encoding block, a modulation block, an RF processing block, and the like. Here, the channel encoding block may include a modulator, an interleaver, a channel encoder, and the like. The modulation block may include an Inverse Fast Fourier Transform (IFFT) operator for mapping a signal provided from the channel encoding block to each subcarrier, and the like. The RF processing block converts a baseband signal provided from the modulation block into an RF signal, and outputs the RF signal to the duplexer 300.

In the aforementioned apparatus, the controller 306, a protocol controller, can perform a function of the HARQ controller 308. These are separately constructed and shown in order to distinguish and describe respective functions in the present invention. Thus, in an actual realization, construction can be such that all the functions are processed in the controller 306.

Figure 4:
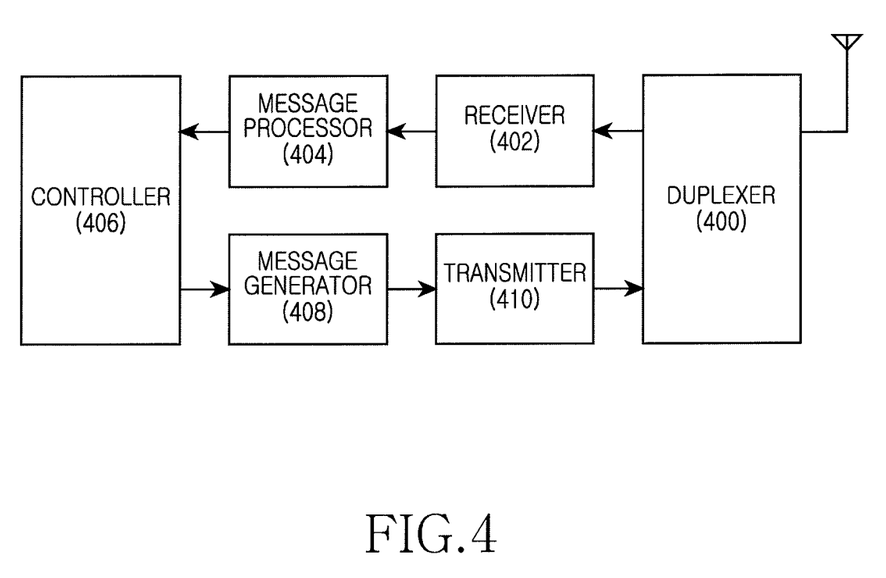
FIG. 4 is a block diagram illustrating an apparatus comprising an MS according to an exemplary embodiment of the present invention.

FIG. 4 is a block diagram illustrating a construction of an MS according to an exemplary embodiment of the present invention.

Referring to FIG. 4, the MS includes a duplexer 400, a receiver 402, a message processor 404, a controller 406, a message generator 408, and a transmitter 410.

According to a duplexing scheme, the duplexer 400 transmits a transmit signal provided from the transmitter 410, through an antenna, and provides a received signal from the antenna, to the receiver 402.

The receiver 402 converts an RF signal provided from the duplexer 400 into a baseband signal, for demodulation. The receiver 402 can include an RF processing block, a demodulation block, a channel decoding block, and the like. Here, the RF processing block converts an RF signal provided from the duplexer 400 into a baseband signal. The demodulation block may include an FFT operator for extracting data load on each subcarrier from a signal provided from the RF processing block, and the like. The channel decoding block may include a demodulator, a de-interleaver, a channel decoder, and the like.

The message processor 404 extracts control information from a signal provided from the receiver 402, and provides the control information to the controller 406. For example, the message processor 404 extracts a UCD message, a resource allocation message and the like from a signal provided from the receiver 402, and provides the extracted UCD message, resource allocation message, and the like to the controller 406. Here, the resource allocation message includes a CDMA_Allocation_IE and a HARQ UL-MAP IE.

The controller 406 controls general operation and scheduling of the MS. For example, the controller 406 identifies ranging code division information in a UCD message provided from the message processor 404.

In a case where the controller 406 transmits a ranging code, the controller 406 controls to select the ranging code according to HARQ support or non-support and transmit the selected ranging code to a BS. Further, as illustrated in FIG. 2, the controller 406 controls to transmit a first ranging request message (RNG-REQ) or a second ranging request message (RNG-REQ) through a UL resource provided from the BS.

According to the control of the controller 406, the message generator 408 generates a control message to be transmitted to a BS. For example, the message generator 408 generates a message for transmitting a ranging code selected in the controller 406, to the BS. For another example, according to the control of the controller 406, the message generator 408 generates a first ranging request message. At this time, in a case where the MS supports HARQ, the message generator 408 may generate a first ranging request message including a GMSH as in Table 5 above. For further example, according to the control of the controller 406, the message generator 408 may generate a second ranging request message.

The transmitter 410 encodes data to be transmitted to the BS and a control message provided from the message generator 408, converts the encoded data and control message into an RF signal, and transmits the RF signal to the duplexer 400. For example, the transmitter 410 can include a channel encoding block, a modulation block, an RF processing block, and the like. Here, the channel encoding block may include a modulator, an interleaver, a channel encoder, and the like. The modulation block may include an IFFT operator for mapping a signal provided from the channel encoding block to each subcarrier, and the like. The RF processing block converts a baseband signal provided from the modulation block into an RF signal, and outputs the RF signal to the duplexer 400.

Although not illustrated, the MS may further include a timer for identifying the number of retransmission of a ranging request message (RNG-REQ). For example, in a case where a frame number index of a CDMA_Allocation_IE is configured with 4 bits, the timer is driven as long as a 16-frame time so as to indicate 16 frames during which information of the CDMA_Allocation_IE is valid. Here, the timer is driven when initially receiving the CDMA_Allocation_IE.

In the aforementioned exemplary embodiment, a BS allocates a UL resource to an MS through a CDMA_Allocation_IE. If the MS supports HARQ, the MS transmits a HARQ block through the UL resource determined through the CDMA_Allocation_IE. At this time, for HARQ, unlike a general burst, the HARQ block is configured in a form in which HARQ Cyclic Redundancy Check (CRC)-16 is added to a MAC PDU. For example, in a case of transmitting a ranging request message (RNG-REQ), the ranging request message (RNG-REQ) is configured in a form in which HARQ CRC-16 is combined to the back of a MAC PDU. Here, the MAC PDU is configured in a form in which a generic MAC header and a MAC Service Data Unit (SDU) are combined with each other. The MAC SDU includes a GMSH, a ranging request message, and CRC-32.

In another exemplary embodiment, if an MS supports HARQ, the MS may configure and transmit a HARQ block in a form of a general burst. That is, the MS can configure a HARQ block with only a MAC PDU without adding HARQ CRC-16 to the MAC PDU. For example, the MS can configure a ranging request message (RNG-REQ) with no addition of HARQ CRC-16.

In this case, a BS identifies CRC-32 included in a MAC SDU of a ranging request message (RNG-REQ) instead of HARQ CRC-16, to identify the occurrence or non-occurrence of an error of the ranging request message (RNG-REQ). At this time, even when the ranging request message (RNG-REQ) is not received, the BS can recognize that an error occurs in the ranging request message (RNG-REQ). If the error occurs in the ranging request message (RNG-REQ), the BS may reallocate a UL resource to the MS as in step 109 of FIG. 1. At this time, after the BS initially allocates the MS a UL resource for the ranging request message (RNG-REQ), the BS can reallocate a resource for the ranging request message (RNG-REQ) only during 16 frames. Here, in a case where the BS reallocates a resource using a CDMA_Allocation_IE, the BS may configure the CDMA_Allocation_IE for reallocating the resource, as in Table 2 above.

As described above, a wireless communication system configures a ranging request message (RNG-REQ) instead of using HARQ CRC-16 in order to reduce an overhead for HARQ transmission. That is, an MS configures a first ranging request message (RNG-REQ) instead of using the HARQ CRC-16. However, the MS may not use a HARQ transmission scheme omitting HARQ CRC-16 for a second ranging request message (RNG-REQ). That is, the second ranging request message (RNG-REQ) can be transmitted using a HARQ UL-MAP IE, because the second ranging request message (RNG-REQ) uses a primary management CID or basic CID included in a first ranging response message (RNG-RSP) responsive to the first ranging request message (RNG-REQ). Accordingly, the second ranging request message (RNG-REQ) can be transmitted using an original HARQ transmission scheme not omitting the HARQ CRC-16.

In the aforementioned exemplary embodiment, a wireless communication system selectively applies HARQ to a ranging request message (RNG-REQ) depending on HARQ support or non-support of an MS.

In another exemplary embodiment, a wireless communication system may selectively apply HARQ to a Session Border Control-REQuest (SBC-REQ) message or a band request message depending on HARQ support or non-support of an MS.

Figure 5:
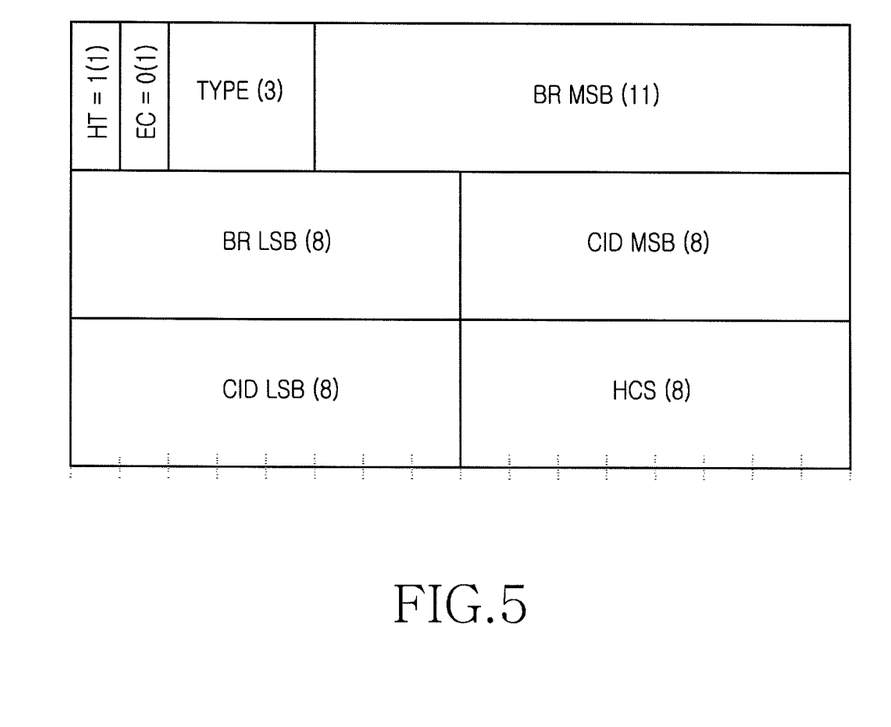
FIG. 5 is a diagram illustrating a band request header according to an exemplary embodiment of the present invention.

In a case where the wireless communication system selectively applies the HARQ to the band request message, the wireless communication system may apply a HARQ transmission scheme omitting HARQ CRC-16 to the band request message. That is, an MS supporting HARQ may transmit the band request message using a transmission scheme not supporting HARQ. For example, in a case where the MS supporting HARQ makes a request for a band, the MS transmits a band request ranging code to a BS. The BS allocates a UL burst of a size of 6 bytes to the MS using a CDMA_Allocation_IE. At this time, the MS transmits a band request header omitting the HARQ CRC-16, to the BS. That is, the MS configures the band request header to exclude the HARQ CRC-16 as shown in FIG. 5, and transmits the band request header to the BS.

At this time, the BS determines whether an error occurs in the band request header using a Header Check Sum (HCS)

included in the band request header. At this time, even when the band request header is not received, the BS can recognize that the error occurs in the band request header. If the error occurs in the band request header, the BS may reallocate a UL resource to the MS as in step 109 of FIG. 1. At this time, after initially allocating a UL resource for the band request header to the MS, the BS can reallocate the UL resource for the band request header only during 16 frames. Here, in a case where the BS reallocates a resource using a CDMA_Allocation_IE, the BS may configure the CDMA_Allocation_IE for reallocating the resource, as in Table 2 above.

As described above, exemplary embodiments of the present invention have an advantage of being capable of minimizing a resource overhead due to HARQ while increasing a range for a ranging service, by distinguishing an MS supporting HARQ and an MS not supporting the HARQ and allocating a resource for ranging in a BS of a wireless communication system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for operating a base station (BS) in a wireless communication system, the method comprising:
    transmitting information regarding at least one ranging code to support a soft combining;
    receiving the at least one ranging code from at least one mobile station (MS);
    transmitting a first resource allocation message to the at least one MS, the first resource allocation message including resource allocation information for the at least one MS to transmit a ranging signal; and
    upon no reception of the ranging signal from the at least one MS, transmitting a second resource allocation message to the at least one MS, the second resource allocation message for requesting a retransmission of the ranging signal,
    wherein the first resource allocation message has a same ranging attributes with the second resource allocation message, and
    wherein the ranging attributes comprise a frame number index, the at least one ranging code, a ranging symbol, and a ranging subchannel.

2. The method of claim 1, wherein transmitting a first resource allocation message to the at least one MS comprises:
    if the at least one ranging code indicates that the at least one MS supports Hybrid Automatic Repeat reQuest (HARM), transmitting the first resource allocation message to the at least one MS.

3. The method of claim 1, wherein the ranging signal includes one of a ranging request message (RNG-REQ) and a bandwidth request message (BR).

4. The method of claim 1, further comprising:
    after transmitting the second resource allocation message, receiving the ranging signal retransmitted from the at least one MS; and
    decoding the received ranging signal by the soft combining in accordance with Hybrid Automatic Repeat reQuest (HARM).

5. The method of claim 4, further comprising:
    transmitting a ranging response signal in response to the received ranging signal.

6. The method of claim 4, wherein transmitting the second resource allocation message to the at least one MS comprises:
    transmitting the second resource allocation message to the at least one MS, if the ranging signal is not received from the at least one MS.

7. A method of operating a mobile station (MS) in a wireless communication system, the method comprising:
    receiving information regarding at least one ranging code to support a soft combining;
    transmitting the at least one ranging code to a base station (BS);
    receiving a first resource allocation message from the BS, the first resource allocation message including resource allocation information for the MS to transmit a ranging signal;
    transmitting the ranging signal to the BS based on the resource information;
    receiving a second resource allocation message from the BS, the second resource allocation message for requesting a retransmission of the ranging signal; and
    upon receiving the second resource allocation message from the BS, retransmitting the ranging signal to the BS,
    wherein the second resource allocation message is received from the BS, in response to no reception of the ranging signal by the BS,
    wherein the first resource allocation message has a same ranging attributes with the second resource allocation message, and
    wherein the ranging attributes comprise a frame number index, the at least one ranging code, a ranging symbol, and a ranging subchannel.

8. The method of claim 7, wherein transmitting the ranging signal to the BS comprises:
    if the at least one ranging code comprises an initial ranging code, transmitting a first ranging request message (RNG-REQ) comprising identification information of the MS and additionally required resource request information, to the BS through an allocated resource in accordance with the resource information.

9. The method of claim 7, wherein the ranging signal includes one of a ranging request message (RNG-REQ) and a bandwidth request message (BR).

10. The method of claim 7, wherein retransmitting the ranging signal to the BS comprises:
    identifying whether the MS can retransmit the ranging signal in accordance with at least one of a number of retransmission of the ranging signal and a retransmission effective time; and
    if the MS can retransmit the ranging signal, retransmitting the ranging signal to the BS.

11. An apparatus of a base station (BS) in a wireless communication system, the apparatus comprising:
    a transmitter configured to transmit information regarding at least one ranging code to support a soft combining;
    a receiver configured to receive the at least one ranging code from at least one mobile station (MS); and
    a controller configured to control the transmitter to:
        transmit a first resource allocation message to the at least one MS, the first resource allocation message including resource allocation information for the at least one MS to transmit a ranging signal; and
        upon no reception of the ranging signal from the at least one MS, transmit a second resource allocation message to the at least one MS, the second resource allocation message for requesting a retransmission of the ranging signal,
    wherein the first resource allocation message has a same ranging attributes with the second resource allocation message, and wherein the ranging attributes comprise a frame number index, the at least one ranging code, a ranging symbol, and a ranging subchannel.

12. The apparatus of claim 11, wherein the controller is configured to control the transmitter to transmit the first resource allocation message to the at least one MS, if the at least one ranging code indicates that the at least one MS supports Hybrid Automatic Repeat reQuest (HARM).

13. The apparatus of claim 11, wherein the ranging signal includes one of a ranging request message (RNG-REQ) and a bandwidth request message (BR).

14. The apparatus of claim 11, wherein the controller is further configured to control the receiver to receive the ranging signal retransmitted from the at least one MS, after transmitting the second resource allocation message, and decode the received ranging signal by the soft combining in accordance with Hybrid Automatic Repeat reQuest (HARM).

15. The apparatus of claim 14, wherein the controller is further configured to control the transmitter to transmit a ranging response signal in response to the received ranging signal.

16. The apparatus of claim 14, wherein the controller is further configured to control the transmitter to transmit the second resource allocation message to the at least one MS, if the ranging signal is not received from the at least one MS.

17. An apparatus of a mobile station (MS) in a wireless communication system, the apparatus comprising:
a receiver;
a transmitter; and
a controller configured to control the transmitter and the receiver to:
receive information regarding at least one ranging code to support a soft combining;
transmit the at least one ranging code to a base station (BS);
receive a first resource allocation message from the BS, the first resource allocation message including resource allocation information for the MS to transmit a ranging signal;
transmit the ranging signal to the BS based on the resource information;
receive a second resource allocation message from the BS, the second resource allocation message for requesting a retransmission of the ranging signal; and
upon receiving the second resource allocation message from the BS, retransmit the ranging signal to the BS,
wherein the second resource allocation message is received from the BS, in response to no reception of the ranging signal by the BS,
wherein the first resource allocation message has a same ranging attributes with the second resource allocation message, and
wherein the ranging attributes comprise a frame number index, the at least one ranging code, a ranging symbol, and a ranging subchannel.

18. The apparatus of claim 17, wherein the controller, if the at least one ranging code comprises an initial ranging code, is configured to transmit a first ranging request message (RNG-REQ) comprising identification information of the MS and additionally required resource request information, to the BS through an allocated resource in accordance with the resource information.

19. The apparatus of claim 17, wherein the ranging signal includes one of a ranging request message (RNG-REQ) and a bandwidth request message (BR).

20. The apparatus of claim 17, wherein the controller determines whether the controller can control to retransmit the ranging signal in accordance with at least one of a number of retransmission of the ranging signal and a retransmission effective time, and
if the controller can control to retransmit the ranging signal, the controller controls to retransmit the ranging signal to the BS through the transmitter.

* * * * *